United States Patent
Beckman et al.

(10) Patent No.: US 10,179,646 B1
(45) Date of Patent: *Jan. 15, 2019

(54) RECONFIGURING PROPELLERS DURING AERIAL VEHICLE OPERATION

(71) Applicant: Amazon Technologies, Inc., Seattle, WA (US)

(72) Inventors: Brian C. Beckman, Newcastle, WA (US); Allan Ko, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,785

(22) Filed: Mar. 9, 2017

Related U.S. Application Data

(63) Continuation of application No. 14/975,167, filed on Dec. 18, 2015, now Pat. No. 9,592,910.

(51) Int. Cl.
| | | |
|---|---|---|
| *B64C 11/20* | (2006.01) | |
| *B64C 27/08* | (2006.01) | |
| *B64C 39/02* | (2006.01) | |
| *B64C 27/46* | (2006.01) | |

(52) U.S. Cl.
CPC .......... *B64C 27/463* (2013.01); *B64C 11/20* (2013.01); *B64C 27/08* (2013.01); *B64C 39/024* (2013.01); *B64C 2201/024* (2013.01); *B64C 2201/108* (2013.01)

(58) Field of Classification Search
CPC ....... B64C 27/463; B64C 27/08; B64C 27/54; B64C 27/615; B64C 39/024; B64C 11/20; B64C 11/28; B64C 2201/108; B64C 2201/024; B64C 2027/7261
See application file for complete search history.

(56) References Cited

U.S. PATENT DOCUMENTS

| | | |
|---|---|---|
| 2,957,526 A | 10/1960 | Hans |
| 3,750,982 A | 8/1973 | Gear |
| 4,168,939 A | 9/1979 | Schmitz et al. |
| 4,533,297 A | 8/1985 | Bassett |
| 5,217,349 A | 6/1993 | Succi |
| 5,584,661 A | 12/1996 | Brooks |
| 5,639,215 A | 6/1997 | Yamakawa et al. |
| 5,711,651 A | 1/1998 | Charles et al. |
| 6,116,857 A | 9/2000 | Splettstoesser et al. |
| 6,168,379 B1 | 1/2001 | Bauer |
| 6,196,796 B1 | 3/2001 | Lozyniak et al. |
| 6,295,006 B1 | 9/2001 | Kohlhepp |
| 6,354,536 B1 | 3/2002 | Torok et al. |

(Continued)

*Primary Examiner* — Michael J Zanelli
(74) *Attorney, Agent, or Firm* — Athorus, PLLC

(57) ABSTRACT

An aerial vehicle may be equipped with propellers having reconfigurable geometries. Such propellers may have blade tips or other features that may be adjusted or reconfigured while the aerial vehicle is operating, on any basis. Propellers having reconfigurable blade tips joined to blade roots may cause the blade tips to be aligned with the blade roots, or substantially perpendicular to the blade roots, e.g., in order to counter adverse effects of tip vortices, or at any intervening angle. The propellers may be reconfigured at predetermined times during operation of an aerial vehicle, or upon sensing one or more operational characteristics or environmental conditions, as may be desired or required.

22 Claims, 10 Drawing Sheets

(56) References Cited

U.S. PATENT DOCUMENTS

| | | |
|---|---|---|
| 6,454,207 B1 | 9/2002 | Yamakawa et al. |
| 6,474,945 B1 | 11/2002 | Nakasato et al. |
| 6,481,964 B2 | 11/2002 | Lorkowski et al. |
| 6,493,689 B2 | 12/2002 | Kotoulas et al. |
| 6,497,385 B1 | 12/2002 | Wachspress et al. |
| 6,530,542 B2 | 3/2003 | Toulmay |
| 6,671,590 B1 | 12/2003 | Betzina et al. |
| 6,974,307 B2 | 12/2005 | Antoune et al. |
| 7,281,900 B2 | 10/2007 | Zientek |
| 7,540,716 B2 | 6/2009 | Wobben |
| 7,821,148 B2 | 10/2010 | Piasecki et al. |
| 7,861,967 B2 | 1/2011 | Karem |
| 8,626,359 B2 | 1/2014 | Andrews |
| 8,672,631 B2 | 3/2014 | Shi |
| 8,753,081 B2 | 6/2014 | Aynsley et al. |
| 9,038,943 B1 | 5/2015 | Morris |
| 9,103,325 B2 | 8/2015 | Koegler et al. |
| 9,120,567 B2 | 9/2015 | Scott et al. |
| 9,140,126 B2 | 9/2015 | Hins |
| 9,442,496 B1 | 9/2016 | Beckman et al. |
| 9,505,492 B2 | 11/2016 | Scott |
| 2002/0021964 A1 | 2/2002 | Janker |
| 2005/0001104 A1 | 1/2005 | Arnaud |
| 2005/0123400 A1 | 6/2005 | Bagai |
| 2007/0131820 A1 | 6/2007 | Chaudhry et al. |
| 2008/0101931 A1 | 5/2008 | Chaudhry et al. |
| 2008/0145220 A1 | 6/2008 | Yeh et al. |
| 2008/0237395 A1 | 10/2008 | Tanabe et al. |
| 2008/0302914 A1 | 12/2008 | Wagner |
| 2010/0178167 A1 | 7/2010 | Jänker et al. |
| 2011/0142642 A1 * | 6/2011 | McGrath ............... F03D 1/065 416/135 |
| 2011/0164976 A1 | 7/2011 | Matalanis et al. |
| 2011/0223033 A1 | 9/2011 | Wang et al. |
| 2011/0236208 A1 | 9/2011 | Hirsch et al. |
| 2012/0070288 A1 | 3/2012 | Höfinger |
| 2012/0217754 A1 | 8/2012 | Fukami |
| 2013/0119187 A1 | 5/2013 | Germanetti |
| 2014/0079234 A1 | 3/2014 | Butts et al. |
| 2015/0100221 A1 | 4/2015 | Routledge et al. |
| 2015/0158580 A1 | 6/2015 | Kelaidis |
| 2015/0360773 A1 | 12/2015 | Allen |
| 2016/0075430 A1 | 3/2016 | Foskey et al. |
| 2016/0083073 A1 | 3/2016 | Beckman |
| 2016/0176506 A1 | 6/2016 | Cross |
| 2016/0244148 A1 | 8/2016 | Linch |
| 2017/0154618 A1 | 6/2017 | Beckman et al. |

* cited by examiner

RECONFIGURING PROPELLERS DURING AERIAL VEHICLE OPERATION

CROSS-REFERENCE TO RELATED APPLICATIONS

This application is a continuation of U.S. patent application Ser. No. 14/975,167, now U.S. Pat. No. 9,592,910, filed Dec. 18, 2015, the contents of which are incorporated by reference herein in their entirety.

BACKGROUND

A wingtip vortex is a natural phenomenon that occurs due to pressure differences that form when a blade is subjected to fluid flow. For example, when an airfoil is provided at a positive angle, a pressure differential exists between an upper surface of the airfoil and a lower surface of the airfoil. More specifically, a pressure above the airfoil is less than atmospheric pressure, while a pressure below the airfoil equals or exceeds atmospheric pressure. Because air will flow consistent with a pressure gradient, e.g., from a high pressure region to a low pressure region, and because a path of least resistance is located at or near an airfoil's tips, air tends to flow outwardly in a spanwise manner toward a blade tip, from a bottom of the airfoil, upwardly and around the tip. In a fixed-wing aircraft, air flows outwardly from a fuselage to which a wing is mounted, toward a tip of the wing. In a rotating wing aircraft, air flows outwardly from a hub about which a propeller rotates, toward tips of the respective blades. Upon reaching the tips of the blades, the air flow spillage spirals beyond the tip of the blade and forms a whirlpool that is known as a vortex.

Wingtip vortices induce substantial amounts of drag. For example, air that spirals beyond a blade tip may combine with wash to form a rapidly spinning trailing vortex. Wingtip vortices thereby decrease the efficiency of a blade, in view of the increased energy that must be expended in order to overcome the drag induced thereby. Typically, the intensity of a wingtip vortex formed during flight is a function of a number of variables, including but not limited to the weight or speed of an aircraft, or an angle of one or more of its blades. Wingtip vortices may also create wind turbulence or other hazardous effects for other aircraft that may be operating nearby.

In the 1970s, during the midst of energy crises that drove up fuel prices around the world, researchers at the National Aeronautics & Space Administration (NASA) began experimenting with winglets, or vertical (or nearly vertical) extensions provided at the ends of wings provided on fixed-wing aircraft. NASA's research determined that the use of winglets could increase the range of fixed-wing aircraft at standard speeds, and improve the ratios of induced drag to induced lift for such aircraft by several percent, particularly where fixed winglets were provided as integral parts of the airfoils of the fixed wings.

DETAILED DESCRIPTION

As is set forth in greater detail below, the present disclosure is directed to reconfigurable blade tips on propellers. More specifically, the systems and methods disclosed herein are directed to operating aerial vehicles with propellers having blade tips or other features that may change their respective geometric configurations either statically or dynamically during operation based on prevailing operating characteristics or environmental conditions. In some embodiments, propellers having two or more blades may include tip portions that may be configured to rotate to varying extents with respect to axes defined by such blades. For example, in some embodiments, a blade tip may be rotated from a positive normal cant angle (e.g., ninety degrees vertically upward with respect to an axis of the blade root extending radially outward from a hub) to a negative normal cant angle (e.g., ninety degrees vertically downward with respect to the axis), or to any intervening cant angle with respect to a blade root between such positions. Moreover, in some embodiments, the blade tips may be maintained at fixed, predetermined cant angles with respect to axes of the blades throughout various revolutions of the blades. In other embodiments, the blade tips may be maintained at cant angles that vary based on the angles of rotation of the respective blades. In still other embodiments, cant angles of the blade tips may be adjusted based on any operating characteristics or environmental conditions, or in response to any changes in such characteristics or conditions, as needed. By enabling a geometric configuration of a blade to be varied during operation, the adverse effects of wingtip vortices or other conditions may be minimized or eliminated, as desired.

Figure 1A:
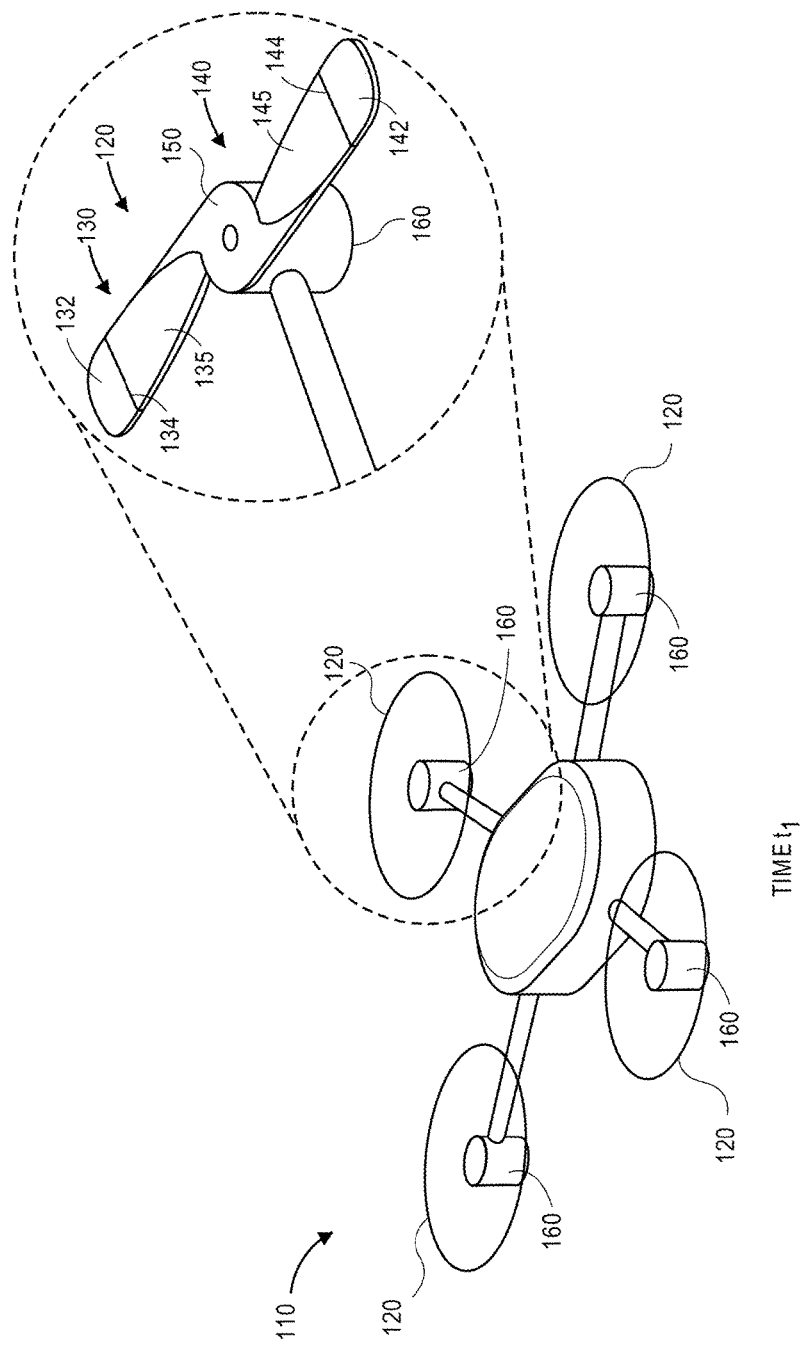
FIGS. 1A through 1C are views of aspects of one aerial vehicle having a propeller with geometrically reconfigurable blades in accordance with embodiments of the present disclosure.
Figure 1B:
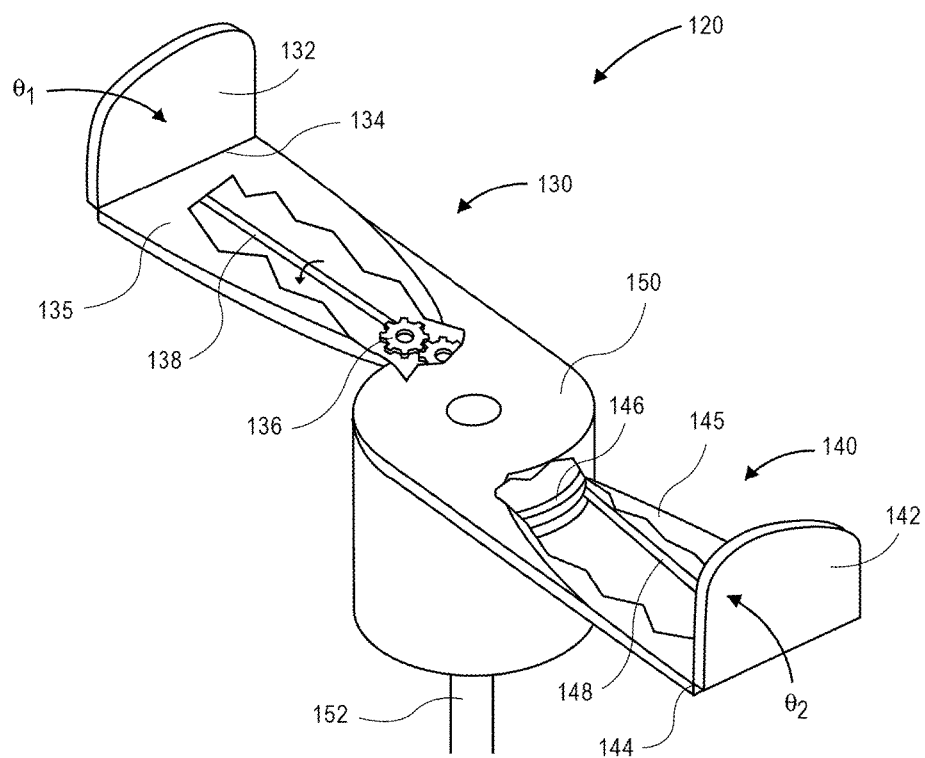
Figure 1C:
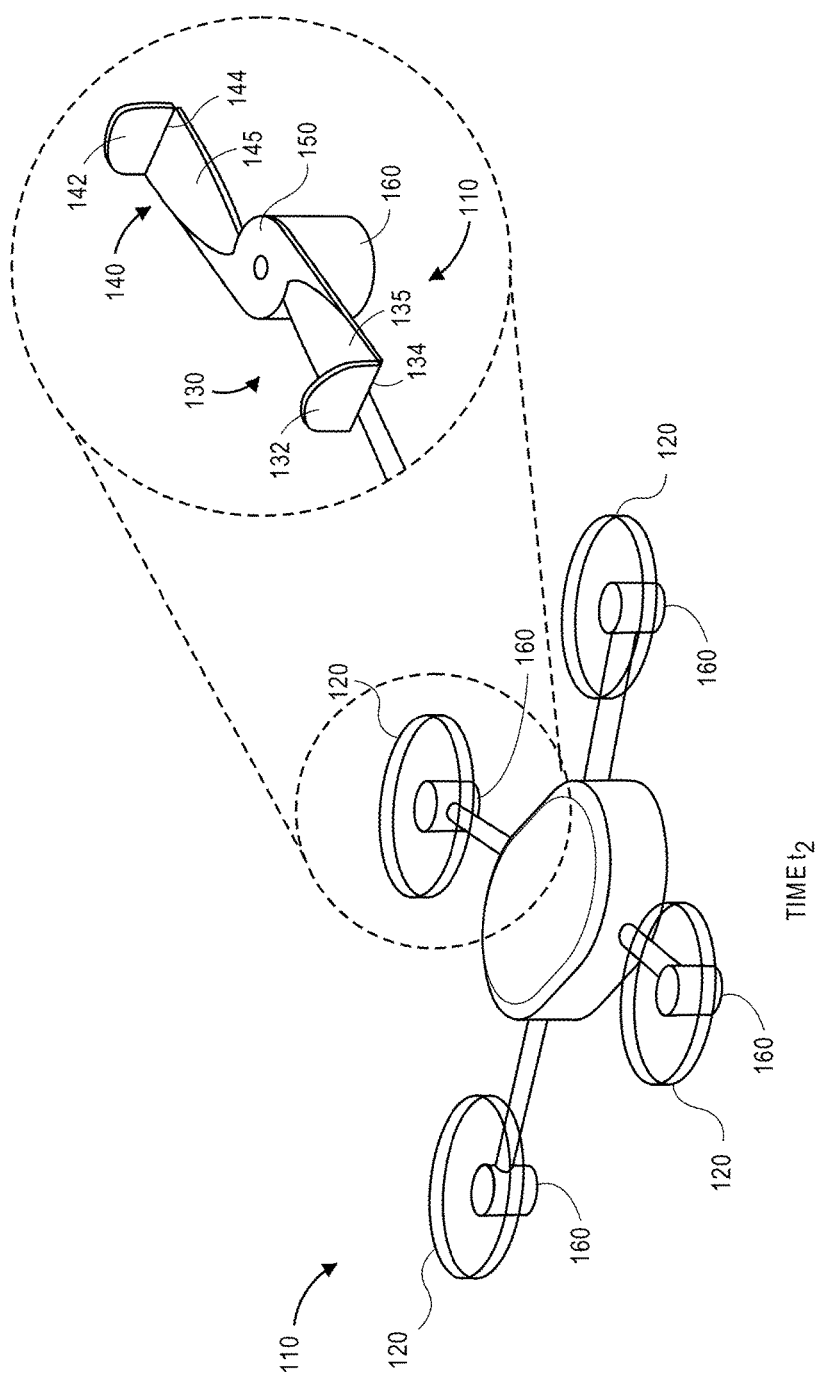

Referring to FIGS. 1A through 1C, views of aspects of one aerial vehicle 110 having propellers with geometrically reconfigurable blades in accordance with embodiments of the present disclosure are shown. As is shown in FIG. 1A, the aerial vehicle 110 (e.g., an unmanned aerial vehicle, or UAV) includes a plurality of propellers 120 that are configured for rotation by respective motors 160 provided thereon. Each of the propellers 120 includes a fixed blade 130 joined to a distal end of a blade root 135 and a fixed blade 140 joined to a distal end of a blade root 145. The blade root 135 and the blade root 145 are each mounted at a proximal end thereof to a hub 150 joined (e.g., by a mast or shaft 152) to one of the motors 160. The hub 150 further includes a mast opening for receiving a mast or a shaft (not shown) of a transmission associated with one of the motors 160.

The motors 160 may be any type or form of motor (e.g., electric, gasoline-powered or any other type of motor) capable of generating sufficient rotational speeds of the corresponding propellers 120 lift the aerial vehicle 110 and any engaged payload, and to aerially transport the engaged payload thereby. Each of the motors 160 may be similar or identical to one another, and may feature similar or identical features (e.g., power sources, numbers of poles, whether the motors are synchronous or asynchronous) or operating characteristics (e.g., angular velocities, torques, operating speeds or operating durations). Alternatively, two or more of the motors 160 may have different features or operating characteristics, based on an extent to which use of such motors or their corresponding propellers 120 is desired or required. Each of such motors 160 may be operated individually or in tandem with one another, for any purpose. For example, two or more of the motors 160 and their corresponding propellers 120 may be operated to provide both lift and thrust, while two or more of the motors 160 and their corresponding propellers 120 may be operated to provide either lift or thrust.

The fixed blade 130 further includes a blade tip 132 mounted to the distal end of the blade root 135 at a hinged connection 134. The blade tip 132 is configured to rotate about a tangential axis defined by the hinged connection 134 with respect to a radial axis defined by the blade root 135. The fixed blade 140 further includes a blade tip 142 mounted to the distal end of the blade root 145 at a hinged connection 144. The blade tip 142 is configured to rotate about a tangential axis defined by the hinged connection 144 with respect to a radial axis defined by the blade root 145. As is further shown in FIG. 1A, at time $t_1$, each of the blade tips 132, 142 is aligned along the radial axes defined by a respective one of the blade roots 135, 145.

Each of the blade tips 132, 142 and each of the blade roots 135, 145 defines an airfoil shape for generating lift when the propeller 120 is rotated about an axis defined by the hub 150 and/or the motor 160, and may, in some embodiments, include rounded leading edges and pointed trailing edges that may include upper surfaces or lower surfaces having symmetrical or asymmetrical shapes or cross-sectional areas. The airfoil shapes defined by the blades 130, 140, and the angles at which the blade roots 135, 145 are mounted to the hub 150, may be selected based on an amount of lift desired to be provided by the propeller 120.

In accordance with the present disclosure, propellers may be configured with blades having blade tips that may rotate with respect to axes defined by such blades, e.g., the blade roots of the respective blades, either statically or dynamically during operation. As is shown in FIG. 1B, the blade tip 132 is rotated vertically upward to a first cant angle $\theta_1$ with respect to the blade root 135, and the blade tip 142 is rotated vertically upward to a second cant angle $\theta_2$ with respect to the blade root 145. The cant angles $\theta_1$, $\theta_2$ are limited only by the constraints resulting from the construction of the blades 130, 140.

The blade tips 132, 142 may be rotated with respect to the blade roots 135, 145 at any time or in accordance with a predetermined schedule (e.g., based at least in part on a transit plan involving travel from an origin to a destination, and optionally through one or more intervening waypoints), or in response to a sensed operating characteristic (e.g., dynamic attributes such as altitudes, courses, speeds, rates of climb or descent, turn rates, accelerations, tracked positions, fuel level, battery level or radiated noise; or physical attributes such as dimensions of structures or frames, numbers of propellers or motors, operating speeds of such motors) or environmental condition (e.g., temperatures, pressures, humidities, wind speeds, wind directions, times of day or days of a week, month or year when an aerial vehicle is operating, measures of cloud coverage, sunshine, or surface conditions or textures).

Additionally, the blade tips 132, 142 may be rotated in any manner or by any means with respect to orientations or configurations defined by the blade roots 135, 145, and to any extent. For example, one or more of the blade roots 135, 145 may include one or more mechanical operators within airfoils of the blade roots 135, 145 that are configured to cause the blade tips 132, 142 to be positioned at a selected cant angle with respect to the blade roots 135, 145. As is shown in FIG. 1B, the blade root 135 may include a gear and cam assembly 136 that rotates based on the rotation of the shaft 152, and causes a follower or push rod 138 to cause the blade tip 132 to be rotated about the hinge 134 to a different cant angle accordingly. As is also shown in FIG. 1B, the blade root 145 may include a cable-driven tension assembly 146 that causes a cable 148 connected to the blade tip 142 to extend or retract against centrifugal forces acting on the blade tip 142, as necessary, in order to cause the blade tip 142 to be rotated about the hinge 144 to a different cant angle accordingly. Those of ordinary skill in the pertinent arts will recognize that the blades 130, 140 may include any other mechanical and/or electrical systems or operators (e.g., within the airfoils of the blade roots 135, 145) for changing the cant angles $\theta_1$, $\theta_2$ of the blade tips 132, 142 with respect to the blade roots 135, 145, or for otherwise geometrically reconfiguring a propeller in accordance with the present disclosure.

The various components of the propeller 120 may be formed from any suitable materials that may be selected based on an amount of lift that may be desired in accordance with the present disclosure. In some implementations, aspects of the propeller 120 (e.g., the blade tips 132, 142, the blade roots 135, 145 and/or the hub 150) may be formed from one or more plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. In some implementations, the aspects of the propeller 120 may be formed of one or more lightweight materials including but not limited to carbon fiber, graphite, machined aluminum, titanium, or fiberglass.

Furthermore, in some embodiments, the various components of the propeller 120 of FIG. 1A may be formed by modifying a standard propeller of any type, size, shape or form. For example, each of the blade tips 132, 142 may be severed from a single blade of a multi-blade propeller, leaving behind the blade roots 135, 145, and reattached to the remaining blade roots 135, 145 from which the blade tips 132, 142 were cut by way of the hinges 134, 144, which may be pivotable connections or shaft assemblies that may be installed between the blade roots 135, 145 and the blade tips 132, 142. In some embodiments, the blade tips 132, 142 may alternatively be provided with one or more biasing elements for urging the blade tips 132, 142 into a predetermined cant angle with respect to a corresponding one of the blade roots 135, 145.

Additionally, the blade tips 132, 142, and/or the blade roots 135, 145 may be solid or substantially solid, and formed from one or more homogenous or heterogeneous materials. Alternatively, the blade tips 132, 142 and/or the blade roots 135, 145 may be substantially hollow, e.g., each having a solid skin defining an airfoil having a hollow cavity therein, with one or more internal supports or structural features for maintaining a shape of the respective airfoils. For example, the propeller 120 or portions thereof may be formed from durable frames of stainless steel, carbon fibers, or other similarly lightweight, rigid materials and reinforced with radially aligned fiber tubes or struts. Utilizing a propeller 120 having a substantially hollow cross-section thereby reduces the mass of the propeller 120, and enables wiring, cables and mechanical or electrical operators, e.g., one or more components of the gear and cam assembly 136 and/or follower or push rod 138 of the blade 130 or one or more components of the tension assembly 146 and/or the cable 148 of the blade 140 to be passed therethrough, and in communication with one or more other control systems components or features. Some other mechanical or electrical operators that may be utilized in accordance with the present disclosure include, but are not limited to, gear boxes, worm gears, servo-controlled arms. For example, mechanical or electrical equipment that is similar to equipment ordinarily utilized to change angles of control surfaces such as flaps, rudders, or ailerons may be incorporated into the blade roots 135, 145 and utilized to change the cant. The propeller 120 or such portions thereof may further be filled with foam or other fillers, strengthened with walls or other supports, and covered with flexible skins for resisting moisture, erosion or any other adverse effects of the elements.

As is shown in FIG. 1C, the aerial vehicle 110 is operating with the blade tips 132, 142 of the propellers 120 at the cant angles $\theta_1$, $\theta_2$ with respect to the corresponding blade roots 135, 145 at time $t_2$.

Accordingly, the systems and methods of the present disclosure are directed to aerial vehicles having rotating propellers with blade tips or other features that may be geometrically modified in flight. A blade tip or other feature may be repositioned to various cant angles with respect to a blade root or other components of a propeller either on a static basis, e.g., where the propeller is rotated with the blade tips at fixed cant angles, or on a dynamic basis, e.g., where the cant angles of such blade tips change on a regular or irregular basis during flight. Additionally, the blade tips may be repositioned based on actual or predicted operating characteristics, actual or predicted environmental conditions, or any other factor. The blade tips may be repositioned by any mechanical or electrical system, which may be provided within a cavity defined within a hollow or substantially hollow airfoil, and to any degree or extent with respect the blade roots to which such tips are joined.

A wingtip vortex is a circular pattern of rotating air that follows an airfoil as lift is generated. High pressure on a lower surface of an airfoil and low pressure on an upper surface of the airflow results in an airflow that curls upwardly around a tip of the airfoil, in a spiraling fashion. In a fixed-wing aircraft, a wingtip vortex follows the tips of each of the wings, as a result of spanwise variation in the lift generated by the wings. In a rotating wing aircraft, however, each of the wingtip vortices departing from a rotating propeller follows a helical path. A wingtip vortex results in substantial amounts of induced drag and imparts downwash from the downwardly spiraling vortices from each of the wings. Accordingly, wingtip vortices are primary contributors to wake turbulence. For example, in a fixed-wing aircraft, wingtip vortices generated from each of the wings spiral in opposite rotational directions and never merge. Instead, the vortices may linger behind the aircraft and dissipate over time.

To address the adverse effects of wingtip vortices, extensions known as winglets have been installed at tips of wings of fixed-wing aircraft, such as jumbo jets or other airplanes. A winglet is an angled or curved extensions of a wing tip provided at a vertical or nearly vertical upward angle, or cant angle, with respect to a blade root. In the presence of airflow resulting from a pressure differential existing between upper and lower surfaces of a blade, a winglet provided at a wingtip results in a horizontal lift component that can smooth airflow existing at the wingtip, and reduce induced drag. As a vortex that begins to rotate from below a wing contacts an angled surface of a winglet, forces of thrust and additional lift are generated. A winglet may be provided as separate or discrete components joined to a blade root in an angled or curved manner, or may be integral extensions of the blade root. Winglets also typically include spanwise cross-sectional areas of decreasing size, and are typically provided as trapezoidal or ellipsoidal extensions from similarly shaped blade roots at varying positive angles (e.g., cant angles) with respect to the blade roots.

The use of winglets tends to change the operational characteristics of an aircraft, however. For example, a winglet may cause an aircraft to be subject to increased lateral forces during evolutions such as landings or takeoffs, and may require the aircraft to be handled differently depending on prevailing weather conditions. The benefits of a winglet may vary as functions of speed, altitude or a number of other factors. Heretofore, winglets have been provided in fixed orientations or constructions with respect to cant angles of blade roots, e.g., at angles that do not and cannot change, and are typically utilized only in fixed-wing aircraft.

The systems and methods of the present disclosure are directed to propeller blades having reconfigurable geometric features, including but not limited to blade tips provided at mechanically adjustable cant angles with respect to their blade roots. The blade tips may be discrete components joined to the blade roots by hinges or other like features or, alternatively, the blade tips may be adjustable portions of blades that are integrally formed as a single unit, e.g., within a common skin of the blade root. The blade tips may be repositioned to any relative cant angle with respect to axes defined by blade roots to which such tips are joined. Moreover, the blade tips may be repositioned using any mechanical or electrical systems, including one or more cam or gear assemblies, motors, electromagnetic systems or tensioning members that cause the blade tips to be drawn radially inward toward a hub of a propeller, in opposition to one or more centrifugal forces acting upon the propeller. Such systems may further incorporate one or more mechanical stops for preventing blade tips from rotating beyond a predetermined limit (including but not limited to ninety degrees, or 90°, or zero degrees, or 0°) into the blade tips or blade roots, or one or more biasing elements, such as torsion springs, for biasing the blade tips into one or more predetermined orientations with respect to the blade roots.

In some embodiments of the present disclosure, a blade tip of a reconfigurable propeller may be realigned to a fixed cant angle with respect to a blade root to which the blade tip is joined, e.g., in a static manner. For example, when a reconfigurable propeller provided on an operating aerial vehicle includes at least one blade tip provided at a first cant angle with respect to a blade root to which the blade tip is joined, and the operation of the aerial vehicle would be enhanced with a blade tip at a second cant angle, the blade tip may be realigned from the first cant angle to the second cant angle in response to a control signal, or based on a sensed environmental condition or operational characteristic, including but not limited to information or data regarding acoustic conditions within a vicinity of the aerial vehicle, or acoustic energies radiating from the aerial vehicle. The blade tips may be repositioned, as necessary, depending on an operating mode of an aerial vehicle, or based on any other criteria. For example, an aerial vehicle equipped with a geometrically configurable propeller in accordance with embodiments of the present disclosure may cause the propeller to operate with blade tips oriented at substantially vertical cant angles with respect to blade roots to which such tips are joined during take-offs and landings (e.g., perpendicular to the blade roots), and with the blade tips co-aligned with the blade roots during horizontal flight in order to reduce drag, thereby enabling the same propeller to operate in an optimal manner in different modes of operation of the aerial vehicle.

In some other embodiments of the present disclosure, a blade tip of a reconfigurable propeller may be realigned in a dynamic manner, such that the blade tip is provided at varying cant angles with respect to axes defined by the blade root to which the blade tip is joined during operation. Dynamic variations of cant angles may be distinguished from static variations of such angles based on the intervals for which blade tips remain fixed at an given cant angle, with statically varying blade tips remaining at such angles for longer durations, and dynamically varying blade tips remaining at such angles for shorter durations. In some embodiments, the cant angle of the blade tip may be changed on a cyclic basis, e.g., such that the cant angle of the blade tip with respect to an axis defined by an extension of the blade root from the hub is determined based on an angular orientation of the blade about an axis of rotation defined by a mast or shaft of a motor or other prime mover. In this regard, the orientation of the blade tip or, alternatively, a length of a blade, may be varied as the propeller rotates about the axis of rotation. In some embodiments, a reconfigurable propeller may substantially co-align blade tips with blade roots to which the blade tips are joined when the propeller is aligned in a direction of travel, e.g., in a longitudinal orientation, to minimize induced drag in forward flight, and may align the blade tips vertically or nearly vertically upward, or substantially perpendicular to such roots, when the propeller is aligned perpendicular to the direction of travel, e.g., in a transverse orientation. Thus, the reconfigurable propeller may take advantage of the benefits associated with wingtips on a rotating blade while also reducing levels of drag that would otherwise be generated by such blade tips during forward flight.

In still other embodiments of the present disclosure, a blade tip of a reconfigurable propeller may be realigned in a dynamic manner subject to feedback provided by one or more sensors. For example, where an aerial vehicle operating one or more reconfigurable propellers having blade tips that are oriented vertically or nearly vertically senses cross winds or other conditions that may be exacerbated based on the cant angles of such tips, the aerial vehicle may cause the cant angles of such tips to be reduced accordingly. Conversely, where an aerial vehicle is determined to be radiating noise at a certain sound pressure level or frequency in excess of one or more standing or temporary limits, a propeller may be reconfigured accordingly. Any type or form of sensor or control system may be used to identify an environmental condition or operational characteristic that requires a reconfiguration of a propeller, e.g., a change in a cant angle of a blade tip with respect to a blade root, and the propeller may be reconfigured accordingly.

The extent to which cant angles of blade tips provided on a propeller blade are dynamically varied, and the periodicity with which such angles are so varied, may be determined based on any number of relevant factors. In some embodiments, an extent to which cant angles of such tips are varied, or the periodicity with which the cant angles are varied, may be determined with linear proportionality to one or more sensed conditions. For example, where an attribute or factor indicative of an operational characteristic of the aerial vehicle or an environmental condition within a vicinity of the aerial vehicle is at a first value, a blade tip may be aligned at a first cant angle that is linearly proportional to the first value, or may be varied at a first periodicity that is linearly proportional to the first value. Where the attribute or factor indicative of the operational characteristic or the environmental condition changes to a second value, the blade tip may be changed to a second cant angle that is linearly proportional to the second value, or may be varied at a second periodicity that is linearly proportional to the second value. In some other embodiments, the extent to which cant angles of blade tips are varied, or the periodicity with which the cant angles are varied, may be determined according to a jump function, e.g., immediately in response to a change in a sensed condition or by a predetermined extent, or in a smoothed manner, or with hysteresis. Any basis for determining an extent to which a cant angle of a blade tip may be varied, or the periodicity with which the cant angle may be varied, may be utilized in accordance with the present disclosure.

Moreover, those of ordinary skill in the pertinent arts will recognize that the systems and methods of the present disclosure may be utilized to realign or readjust any attribute of a reconfigurable propeller, including not only cant angles of blade tips with respect to blade roots, but also blade pitches, blade lengths, blade rake angles, or any other attribute of the propeller. Furthermore, those of ordinary skill in the pertinent arts will further recognize that an aerial vehicle may be equipped with reconfigurable propellers in a homogenous manner, e.g., such that each of the blades of each of the propellers includes common features for reconfiguring such blades, for example, by adjusting cant angles of blade tips with respect to blade roots in an identical fashion. Alternatively, an aerial vehicle may be equipped with some reconfigurable propellers and some propellers that are not reconfigurable, and a reconfigurable propeller may include different features for reconfiguring different blades provided on the propeller in different manners. Likewise, a propeller may be reconfigured based on not only sensed environmental conditions or operational characteristics (e.g., actual conditions or characteristics) but also predicted environmental conditions or operational characteristics, or on any other factors.

Figure 2:
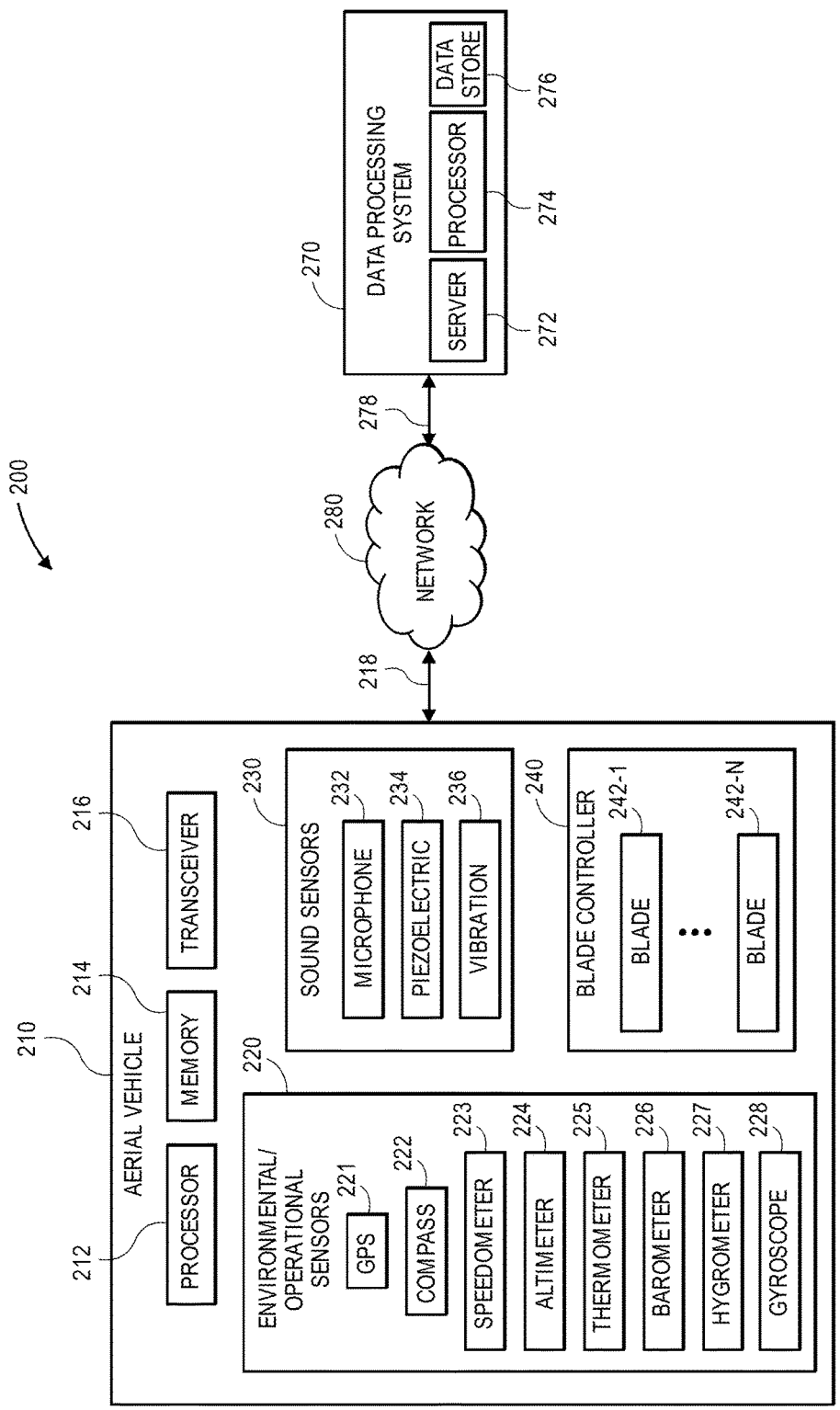
FIG. 2 is a block diagram of one system for operating an aerial vehicle having a propeller with a geometrically reconfigurable blade in accordance with embodiments of the present disclosure.

Referring to FIG. 2, a block diagram of components of one system 200 for operating an aerial vehicle having a propeller with reconfigurable blade tips in accordance with embodiments of the present disclosure is shown. The system 200 of FIG. 2 includes an aerial vehicle 210 and a data processing system 270 connected to one another over a network 280.

The aerial vehicle 210 includes a processor 212, a memory 214 and a transceiver 216, as well as a plurality of environmental or operational sensors 220, a plurality of sound sensors 230 and a plurality of blade controllers 240.

The processor 212 may be configured to perform any type or form of computing function associated with the operation of the aerial vehicle 210, including but not limited to the execution of one or more machine learning algorithms or techniques, e.g., for predicting one or more attributes of the aerial vehicle 210 based on historical data regarding prior operations of the aerial vehicle 210, or one or more other aerial vehicles. The processor 212 may control any aspects of the operation of the aerial vehicle 210 and the one or more computer-based components thereon, including but not limited to the transceiver 216, the environmental or operational sensors 220, the sound sensors 230, and/or the blade controllers 240. The aerial vehicle 210 may likewise include one or more control systems (not shown) that may generate instructions for operating any number of components of the aerial vehicle 210, e.g., one or more rotors, motors, rudders, ailerons, flaps or other components provided thereon. Such control systems may be associated with one or more other computing devices or machines, and may communicate with the data processing system 270 or one or more other computer devices (not shown) over the network 280, through the sending and receiving of digital data. The aerial vehicle 210 further includes one or more memory or storage components 214 for storing any type of information or data, e.g., instructions for operating the aerial vehicle, or information or data captured by one or more of the environmental or operational sensors 220, the sound sensors 230, and/or the blade controllers 240.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly.

The environmental or operational sensors 220 may include any components or features for determining one or more attributes of an environment in which the aerial vehicle 210 is operating or may be expected to operate, or an operational characteristic of the aerial vehicle 210, including extrinsic information or data or intrinsic information or data. As is shown in FIG. 2, the environmental or operational sensors 220 may include, but are not limited to, a Global Positioning System ("GPS") receiver or sensor 221, a compass 222, a speedometer 223, an altimeter 224, a thermometer 225, a barometer 226, a hygrometer 227, or a gyroscope 228. The GPS sensor 221 may be any device, component, system or instrument adapted to receive signals (e.g., trilateration data or information) relating to a position of the handheld device 250 from one or more GPS satellites of a GPS network (not shown). The compass 222 may be any device, component, system, or instrument adapted to determine one or more directions with respect to a frame of reference that is fixed with respect to the surface of the Earth (e.g., a pole thereof). The speedometer 223 may be any device, component, system, or instrument for determining a speed or velocity of the aerial vehicle 210, and may include related components (not shown) such as pitot tubes, accelerometers, or other features for determining speeds, velocities, or accelerations.

The altimeter 224 may be any device, component, system, or instrument for determining an altitude of the aerial vehicle 210, and may include any number of barometers, transmitters, receivers, range finders (e.g., laser or radar) or other features. The thermometer 225, the barometer 226 and the hygrometer 227 may be any devices, components, systems, or instruments for determining local air temperatures, atmospheric pressures, or humidities, respectively, within a vicinity of the aerial vehicle 210. The gyroscope 228 may be any mechanical or electrical device, component, system, or instrument for determining an orientation, e.g., the orientation of the aerial vehicle 210. For example, the gyroscope 228 may be a traditional mechanical gyroscope having at least a pair of gimbals and a flywheel or rotor. Alternatively, the gyroscope 228 may be an electrical component such a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 210.

Those of ordinary skill in the pertinent arts will recognize that the environmental or operational sensors 220 may include any type or form of device or component for determining an environmental condition within a vicinity of the aerial vehicle 210, or an operational characteristic of the aerial vehicle 210, in accordance with the present disclosure. For example, the environmental or operational sensors 220 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers, tachometers or the like, as well as one or more imaging devices (e.g., digital cameras), and are not limited to the sensors 221, 222, 223, 224, 225, 226, 227, 228 shown in FIG. 2.

The sound sensors 230 may include other components or features for detecting and capturing sound energy in a vicinity of an environment in which the aerial vehicle 210 is operating, or may be expected to operate. As is shown in FIG. 2, the sound sensors 230 may include a microphone 232, a piezoelectric sensor 234, and a vibration sensor 236. The microphone 232 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphone 232 may also be provided as a discrete component, or in combination with one or more other components, e.g., an imaging device such as a digital camera. Furthermore, the microphone 232 may be configured to detect and record acoustic energy from any and all directions.

The piezoelectric sensor 234 may be configured to convert changes in pressure, including but not limited to such pressure changes that are initiated by the presence of acoustic energy across various bands of frequencies, to electrical signals, and may include one or more crystals, electrodes or other features. The vibration sensor 236 may be any device configured to detect vibrations of one or more components of the aerial vehicle 210, and may also be a piezoelectric device. For example, the vibration sensor 236 may include one or more accelerometers, e.g., an application-specific integrated circuit and one or more microelectromechanical sensors in a land grid array package, that are configured to sense differential accelerations along one or more axes over predetermined periods of time and to associate such accelerations with levels of vibration and, therefore, sound.

The blade controllers 240 may include a plurality of components for operating and/or adjusting one or more attributes of one of a plurality of reconfigurable blades 242-1 . . . 242-n, e.g., at a predetermined time or in accordance with a predefined schedule, or in response to one or more control signals, sensed environmental conditions or sensed operational characteristics. For example, such controllers 240 may be configured to rotate blade tips of such reconfigurable blades 242-1 . . . 242-n about axes defined with respect to blade roots to which such blade tips are joined. Alternatively, the blade controllers 240 may be configured to change any number of other attributes of such reconfigurable blades 242-1 . . . 242-n. The blade controllers 240 may thus control, initiate or operate one or more mechanical or electrical features provided on or in association with such reconfigurable blades 242-1 . . . 242-n for altering one or more attributes thereof.

The data processing system 270 includes one or more physical computer servers 272 having a plurality of data stores (e.g., data bases) 276 associated therewith, as well as one or more computer processors 274 provided for any specific or general purpose. For example, the data processing system 270 of FIG. 2 may be independently provided for the exclusive purpose of receiving, analyzing, or storing information regarding one or more missions or evolutions that have been performed or are scheduled to be performed by the aerial vehicle 210. Alternatively, the data processing system 270 may be provided in connection with one or more physical or virtual services configured to receive, analyze, or store instructions for operating the aerial vehicle 210 or other information or data, as well as to perform one or more other functions. The servers 272 may be connected to or otherwise communicate with the data stores 276 and the processors 274. The data stores 276 may store any type of information or data, including but not limited to information or data regarding the operation of the aerial vehicle 210, e.g., with respect to one or more attributes of the reconfigurable blades 242-1 . . . 242-n, or information or data regarding environmental conditions, operational characteristics, or positions, for any purpose.

The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., media files received from the aerial vehicle 210, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the network 280 and/or the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device in real time or in near-real time, or in one or more offline processes, via the network 280. Those of ordinary skill in the pertinent art would recognize that the aerial vehicle 210 or the data processing system 270 may communicate with any of a number of computing devices that are capable of communicating over the network 280, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 274, or any other computers or control systems utilized by the aerial vehicle 210 or the data processing system 270, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
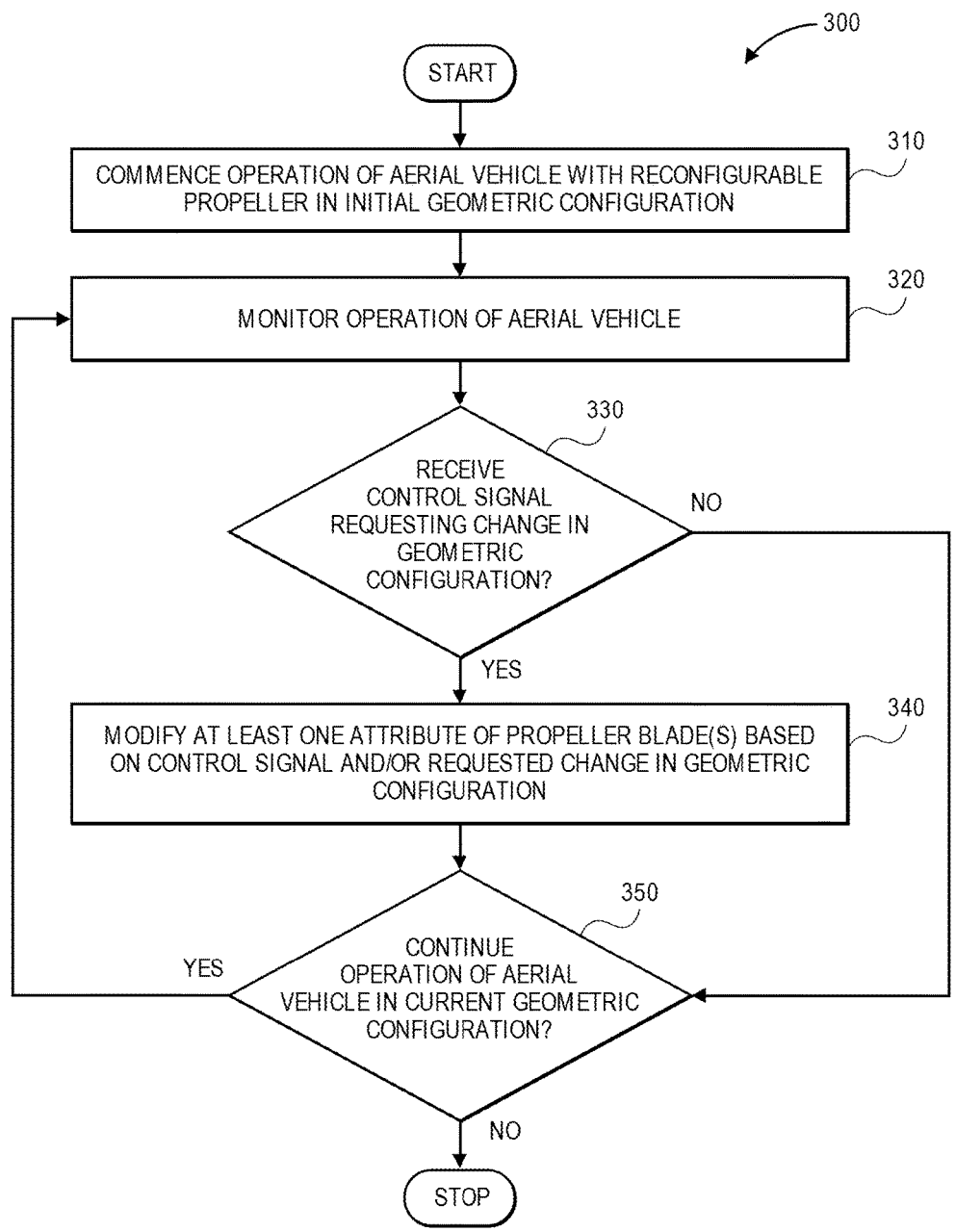
FIG. 3 is a flow chart of one process for operating an aerial vehicle having a propeller with a geometrically reconfigurable blade in accordance with embodiments of the present disclosure.

As is discussed above, propellers having reconfigurable blade tips may be placed into different geometric configurations corresponding to different modes of operation of an aerial vehicle, or for any other purpose. For example, in some embodiments, a propeller may align one or more blade tips at a first cant angle with respect to a blade root during a take-off operation, at a second cant angle with respect to the blade root during a transit or in forward flight, or at a third cant angle with respect to the blade root when during a landing operation. Referring to FIG. 3, a flow chart 300 of one process for one process for operating an aerial vehicle having a propeller with a geometrically reconfigurable blade in accordance with embodiments of the present disclosure is shown. At box 310, operation of an aerial vehicle having a propeller in an initial geometric configuration is commenced. The geometric configuration may be specifically selected for an intended evolution or mission of the aerial vehicle, e.g., a take-off or landing event. For example, an aerial vehicle having a propeller with reconfigurable blade tips may depart from an origin with the blade tips at zero degree (0°) cant angles with respect to axes defined by the propeller's blade roots. At box 320, operation of the aerial vehicle is monitored, e.g., using one or more sensors or control systems, including but not limited to one or more of the environmental or operational sensors 220 described above with regard to FIG. 2, or any other sensors or sensing systems.

At box 330, whether a control signal requesting a change in the geometric configuration is received may be determined. The control signal may be received from a control system having one or more processors, and may be provided on a predetermined schedule or at a predetermined time, or in response to one or more sensed operating characteristics or environmental conditions. For example, a transit plan comprising information regarding a mission to be performed by the aerial vehicle, including but not limited to dates or times at which the aerial vehicle is to depart from or arrive at an origin, a destination, or one or more intervening waypoints, or actions or evolutions to be performed by the aerial vehicle at the origin, at the destination, or at the waypoints, or while in transit, may further include information regarding geometric configurations of propeller blades (e.g., cant angles at which blade tips should be aligned with respect to blade roots) during one or more aspects of the transit, the actions or the evolutions.

If the control signal is received, then the process advances to box 340, where at least one attribute of one or more of the blades of the propeller is modified in response to the control signal. For example, where the propeller is equipped with reconfigurable blade tips, a cant angle of one or more of the blade tips with respect to a corresponding one of the blade roots may be modified accordingly. At box 350, whether the continued operation of the aerial vehicle with the propeller in the current geometric configuration is desired may be determined. If the continued operation of the aerial vehicle in the current geometric configuration is desired, then the process returns to box 320, where the operation of the aerial vehicle is monitored, e.g., using one or more sensors or sensing systems. If the continued operation of the aerial vehicle in the current geometric configuration is no longer desired, however, then the process ends.

Accordingly, the systems and methods of the present disclosure may be utilized to change a geometric configuration of one or more blades of one or more propellers, e.g., in accordance with an operational mode of an aerial vehicle, or in response to one or more operating characteristics of the aerial vehicle (e.g., altitudes, courses, speeds, rates of climb or descent, turn rates, accelerations, tracked positions, fuel level, battery level or radiated noise) or environmental conditions in a vicinity of the aerial vehicle (e.g., temperatures, pressures, humidities, wind speeds, wind directions, times of day or days of a week, month or year when an aerial vehicle is operating, measures of cloud coverage, sunshine, or surface conditions or textures), or for any other reason.

Figure 4A:
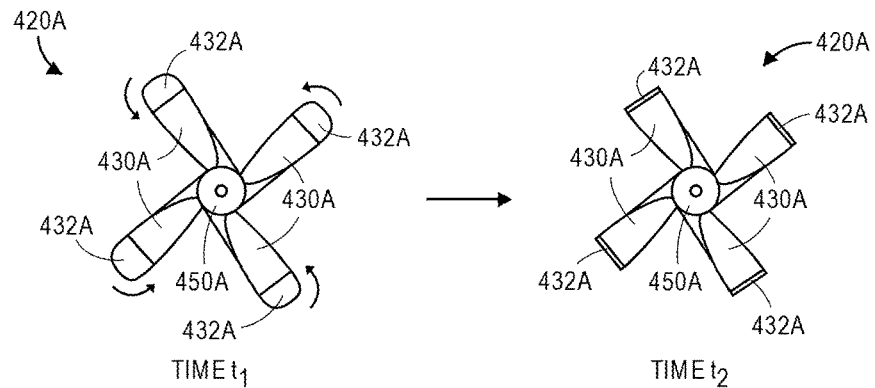
FIGS. 4A through 4C are views of reconfigurable propellers in accordance with embodiments of the present disclosure.
Figure 4B:
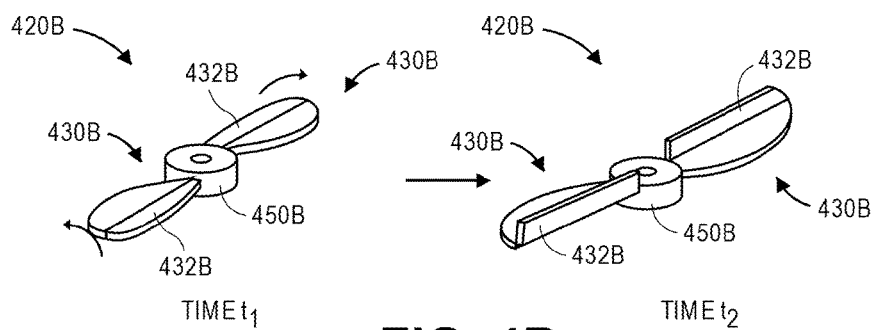
Figure 4C:
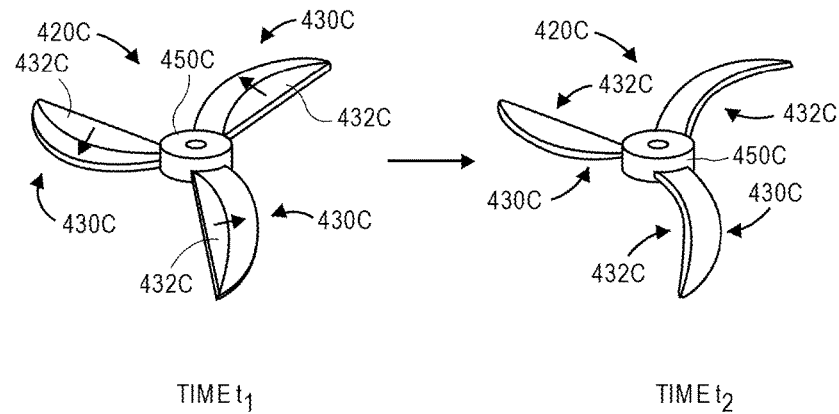

As is discussed above, a geometric configuration of a propeller blade may be changed in any manner, e.g., from a first configuration to a second configuration, while the propeller blade is rotating in accordance with the present disclosure. Referring to FIGS. 4A, 4B, and 4C, views of reconfigurable propellers 420A, 420B, and 420C in accordance with embodiments of the present disclosure are shown. Except where otherwise noted, reference numerals preceded by the number "4" shown in FIG. 4A, 4B or 4C indicate components or features that are similar to components or features having reference numerals preceded by the number "1" shown in FIGS. 1A through 1C.

As is shown in FIG. 4A, a first propeller 420A includes four reconfigurable propeller blades 430A mounted about a hub 450A. Each of the reconfigurable blades 430A includes an adjustable blade tip 432A mounted to a blade root 435A at cant angles that may be modified during operation. At a first time $t_1$, the blade tips 432A are each substantially co-aligned with axes defined by the blade roots 435A, e.g., at zero degree (0°) cant angles with respect to such roots 435A. At a second time $t_2$, however, the blade tips 432A are each aligned substantially perpendicular to the axes defined by the blade roots 435A, e.g., at ninety degree (90°) cant angles with respect to such roots 435A.

As is shown in FIG. 4B, a second propeller 420B includes a pair of reconfigurable propeller blades 430B mounted about a hub 450B. Each of the reconfigurable blades 430B includes an adjustable blade trailing edge 432B mounted to a blade root 435B at cant angles that may be modified during operation. At a first time $t_1$, the blade trailing edges 432B are each substantially co-aligned with the blade roots 435B, e.g., within a common plane with such roots 435B. At a second time $t_2$, however, the blade trailing edges 432B are each aligned substantially perpendicular to planes of the blade roots 435B, e.g., at ninety-degree (90°) cant angles with respect to such roots 435B.

As is shown in FIG. 4C, a third propeller 420C includes three reconfigurable propeller blades 430C mounted about a hub 450C. Each of the reconfigurable blades 430C includes an adjustable camber 432C of a blade root 435C at widths that may be modified during operation. At a first time $t_1$, the blade cambers 432C are fully extended to a maximum width of the blade roots 435C. At a second time $t_2$, however, the blade cambers 432C are fully retracted within the blade roots 435C to a minimum width.

Figure 5:
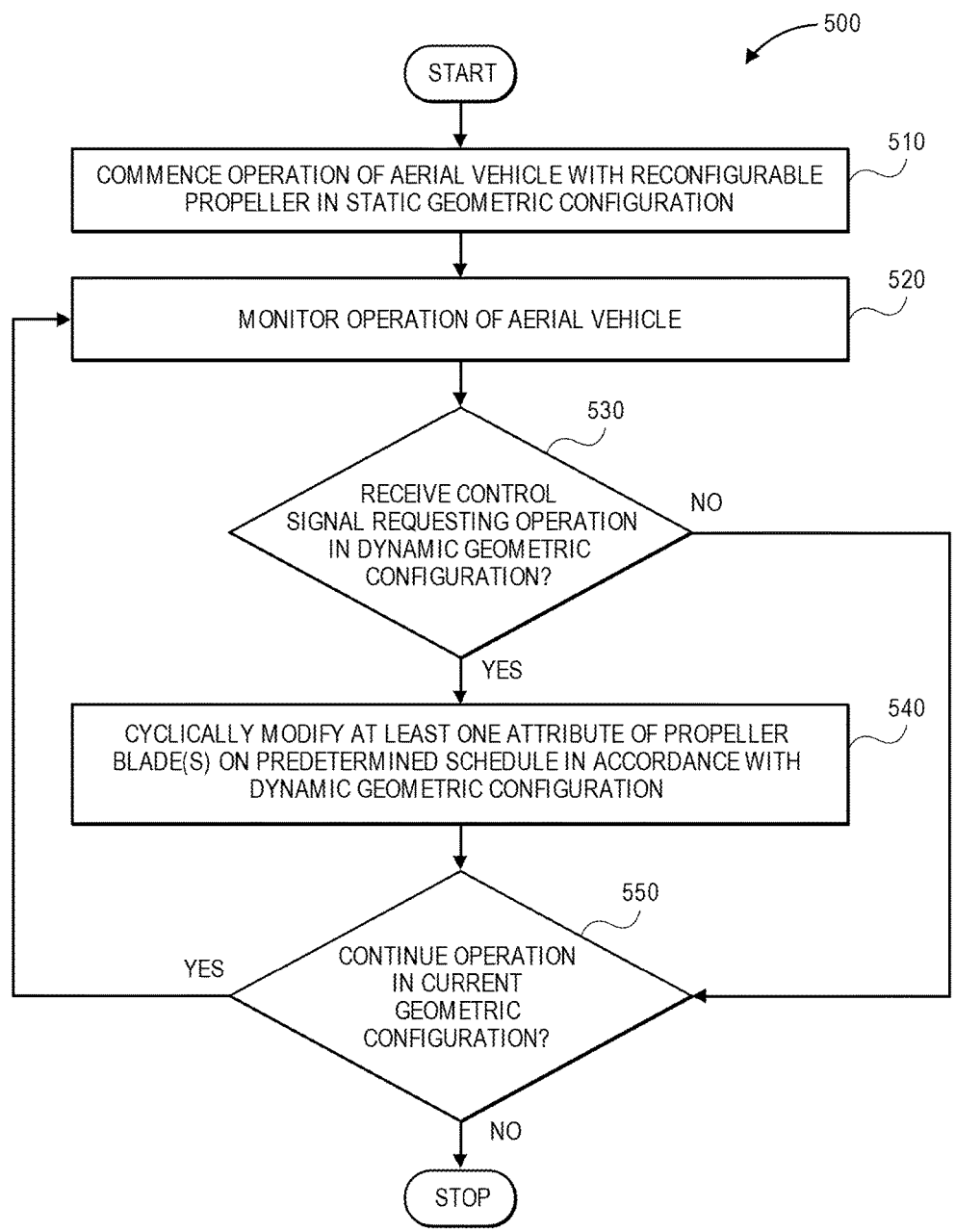
FIG. 5 is a flow chart of one process for operating an aerial vehicle having a propeller with a geometrically reconfigurable blade in accordance with embodiments of the present disclosure.

As is also discussed above, the geometric configurations of propeller blades (e.g., cant angles of blade tips with respect to blade roots) may be changed on a regular or irregular basis while in operation. For example, the geometric configurations may be automatically changed to reduce an area of a blade presented during forward flight, and also to mitigate the adverse effects of tip vortices, by minimizing a cant angle of a blade tip with respect to a blade root when the blade is aligned in a longitudinal orientation (e.g., pointed in a direction of the forward flight, or in an opposite direction) and maximizing the cant angle of the blade tip when the blade is aligned in a transverse direction (e.g., perpendicular to the direction of the forward flight). Referring to FIG. 5, a flow chart 500 of one process for one process for operating an aerial vehicle having a propeller with a geometrically reconfigurable blade in accordance with embodiments of the present disclosure is shown. At box 510, operation of an aerial vehicle with a reconfigurable propeller in a static geometric configuration, e.g., with a blade tip at a fixed cant angle with respect to a blade root, is commenced. At box 520, operation of the aerial vehicle is monitored, e.g., using one or more sensors or control systems.

At box 530, whether a control signal requesting a change in the geometric configuration is received, e.g., using one or more sensors or control systems, may be determined. If the control signal is received, then the process advances to box 540, where at least one attribute of one or more of the blades of the propeller is cyclically modified in accordance with a predetermined schedule defined by a dynamic geometric configuration, e.g., in response to the control signal. For example, with regard to an angular orientation of the propeller, a cant angle of one or more blade tips of the propeller with respect to a blade root may be continuously changed, e.g., between a predefined range of cant angles, as the propeller rotates in operation. Alternatively, in some other embodiments, the cant angles of the blade tips may be changed on an iterative basis, at various fixed angular intervals. In still other embodiments, the cant angles of the blade tips may be changed on an irregular basis.

At box 550, whether the continued operation of the aerial vehicle with the propeller in the current dynamic geometric configuration is desired may be determined. If the continued operation of the aerial vehicle in the current geometric configuration is desired, then the process returns to box 520, where the operation of the aerial vehicle is monitored, e.g., using one or more sensors or sensing systems. If the continued operation of the aerial vehicle in the current dynamic geometric configuration is no longer desired, however, then the process ends.

Figure 6:
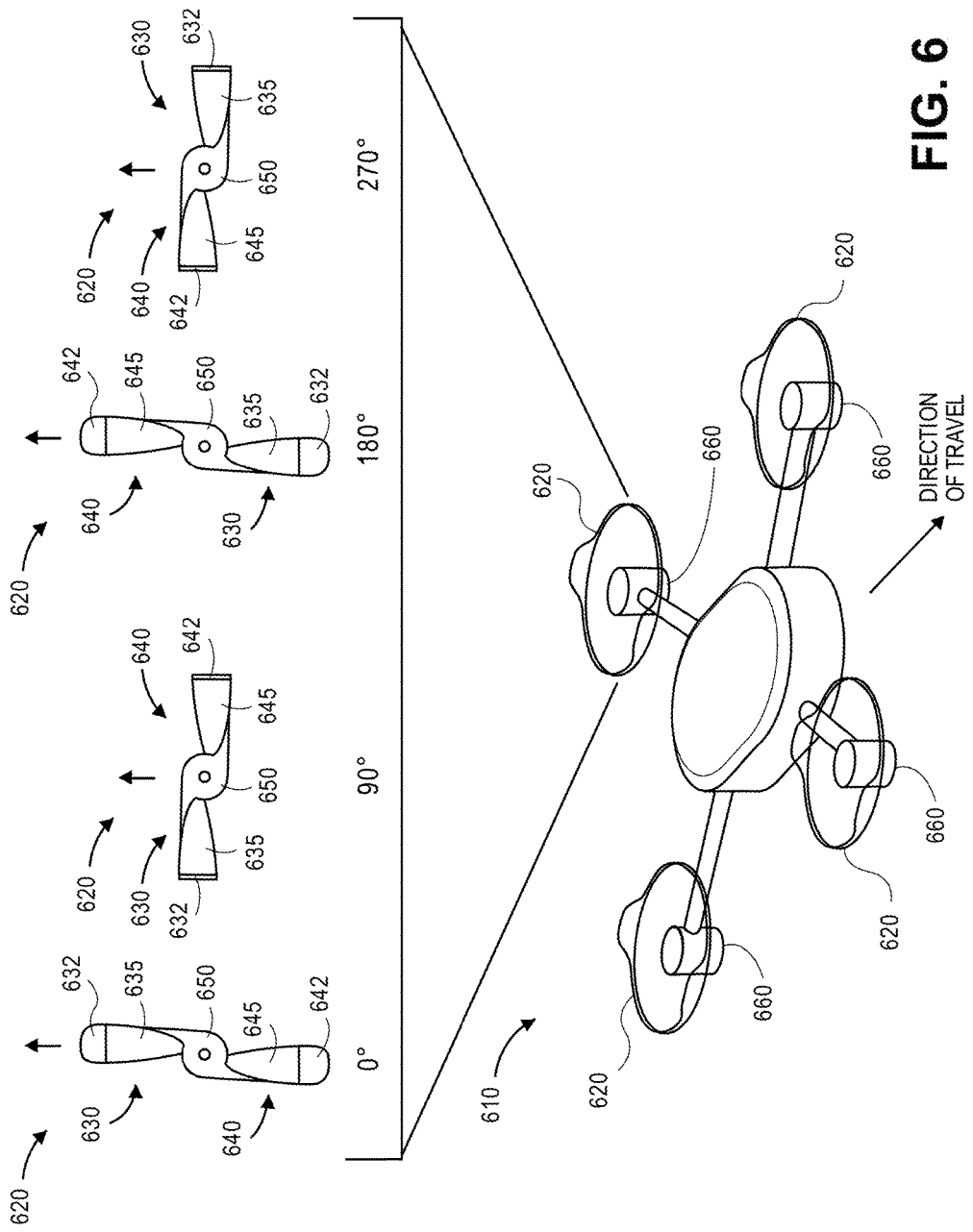
FIG. 6 is a view of aspects of one aerial vehicle having a propeller with a geometrically reconfigurable blade in accordance with embodiments of the present disclosure.

As is discussed above, a geometric configuration of a propeller blade may be changed on a regular basis, e.g., consistent with an angular orientation of the propeller blade, while the propeller is rotating. For example, in some embodiments, a cant angle of a blade tip of a propeller blade with respect to a blade root may be changed with respect to an angular orientation of the propeller blade during operation. Referring to FIG. 6, a view of aspects of one aerial vehicle having a propeller with a geometrically reconfigurable blade in accordance with embodiments of the present disclosure is shown. Except where otherwise noted, reference numerals preceded by the number "6" shown in FIG. 6 indicate components or features that are similar to components or features having reference numerals preceded by the number "4" shown in FIG. 4A, 4B or 4C, or by the number "1" shown in FIGS. 1A through 1C.

As is shown in FIG. 6, an aerial vehicle 610 includes a plurality of reconfigurable propellers 620, each of which is mounted to a rotatable motor 660. Each of the propellers 620 includes a pair of blades 630, 640 mounted about a hub 650. The blade 630 includes a reconfigurable blade tip 632 mounted to a blade root 635. The blade 640 includes a reconfigurable blade tip 642 mounted to a blade root 645.

In accordance with the present disclosure, a propeller configuration may be changed on a regular basis, e.g., in a manner consistent with the rotation of the propeller. For example, as is shown in FIG. 6, when the propellers 620 are aligned parallel to a direction of travel of the aerial vehicle 610, e.g., at zero degree (0°) or one hundred eighty degree (180°) angles about their axes of rotation, the blade tips 632, 642 are fully extended and co-aligned with the blade roots 635, 645. When the propellers 620 are rotated perpendicular to the direction of travel of the aerial vehicle 610, e.g., at ninety degree (90°) or two hundred seventy degree (270°) angles about their axes of rotation, the blade tips 632, 642 are fully raised with respect to the blade roots 635, 645. Thus, the geometries of the respective blades 630, 640 may be changed to resist the effects of tip vortices when the blades 630, 640 are perpendicular to the direction of travel of the aerial vehicle 610, and to reduce sizes of profiles presented by such tips and any drag induced thereby when the blades 630, 640 are aligned with the direction of travel of the aerial vehicle 610.

As is further discussed above, a geometric configuration of a propeller blade may be changed in response to a sensed operating characteristic or environmental condition of an aerial vehicle. For example, a geometric configuration of a propeller blade may be automatically modified when the aerial vehicle arrives at a given location, reaches a predetermined altitude or speed, experiences a specific rate of climb or descent, or rate of turn), or enters within a predefined range of a particular structure, property individual or location of interest. The geometric configuration of the propeller blade may be further modified when the aerial vehicle senses or a specific temperature, barometric pressure, humidity level, wind speed or ambient sound level, or predicts that such a temperature, pressure, humidity level, wind speed, or ambient sound level may soon be encountered. The geometric configuration of the propeller blade may be further modified when the aerial vehicle determines that a weather event is anticipated, is occurring, or has occurred. The geometric configuration of the propeller blade may also be modified when the aerial vehicle is determined to be radiating sound at a predetermined sound pressure level (or intensity) or frequency, or when such a sound is otherwise sensed or detected.

Figure 7:
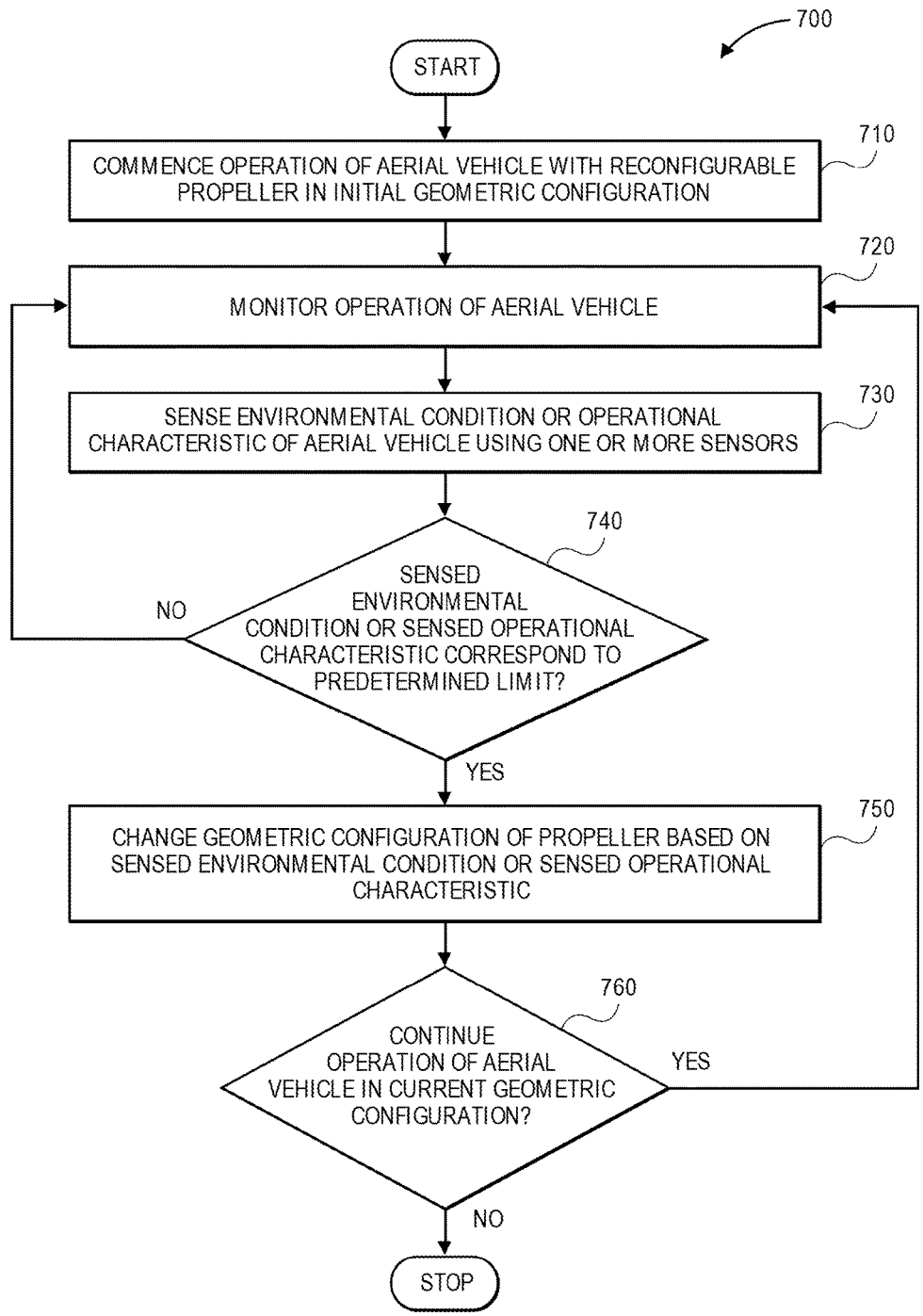
FIG. 7 is a flow chart of one process for operating an aerial vehicle having a propeller with a geometrically reconfigurable blade in accordance with embodiments of the present disclosure.

Referring to FIG. 7, a flow chart 700 of one process for one process for operating an aerial vehicle having a propeller with a geometrically reconfigurable blade in accordance with embodiments of the present disclosure is shown. At box 710, operation of an aerial vehicle with a reconfigurable propeller in an initial geometric configuration is commenced, and at box 720, the operation of the aerial vehicle is monitored, e.g., using one or more sensors or control systems.

At box 730, an environmental condition or operational characteristic of the aerial vehicle is sensed by one or more sensors. For example, the environmental condition may be any determinable factor or metric associated with an area in which the aerial vehicle is operating, or is expected to operate, including but not limited to information or data regarding atmospheric or weather conditions, ground conditions at an origin or a destination or along a predetermined route, or any other relevant factor. Likewise, the operational characteristic may be any determinable factor or metric associated with the operation of the aerial vehicle, including but not limited to altitudes, positions, velocities, accelerations, or rates of climb, turn or descent, as well as radiated sound levels or rotational speeds (e.g., angular velocities) of one or more engines or motors. The aerial vehicle may be configured to monitor one or more environmental conditions or operational characteristics on a continuous basis, or at predetermined times or in accordance with a predetermined schedule. Alternatively, those of ordinary skill in the pertinent art will recognize that the process represented in the flow chart 700 of FIG. 7 may operate based on a prediction of an environmental condition or operational characteristic, which may be determined according to one or more machine learning systems or algorithms, which may generate one or more models for predicting such conditions or characteristics based on substantially large corpuses of historical data regarding prior operations of one or more aerial vehicles, including but not limited to environmental conditions or operational characteristics encountered by such vehicles.

At box 740, whether the sensed environmental condition and/or the sensed operational characteristic corresponds to a predetermined threshold is determined. For example, a sensed position, temperature, wind speed or direction, or radiated sound level (or, alternatively, a predicted position, temperature, wind speed or direction, or radiated sound level) may be compared to a threshold position, temperature, wind speed or direction, or radiated sound level. If the sensed environmental condition and/or the sensed operational characteristic does not correspond to the predetermined limit, then the process returns to box 720, where the operation of the aerial vehicle is monitored accordingly.

If the sensed environmental condition and/or the sensed operational characteristic corresponds to the predetermined limit, however, then the process advances to box 750, where the geometric configuration of the propeller is changed based on the sensed environmental condition and/or the sensed operational characteristic. For example, the geometric configuration of the propeller may be changed by a predetermined extent, e.g., a blade tip may be automatically placed at a predetermined cant angle with respect to a blade root, when the sensed environmental condition and/or the sensed operational characteristic is determined to correspond to the predetermined limit. Alternatively, the extent to which the geometric configuration is changed may be determined based at least in part on the sensed environmental condition and/or the sensed operational characteristic. For example, where it is determined that noise at a first sound pressure level is radiating from an aerial vehicle, a blade tip may be repositioned to a first cant angle with respect to an axis of extension, e.g., in a radial direction, defined by a blade root. Where it is determined that noise at a second sound pressure level is radiating from the aerial vehicle, however, the blade tip may be repositioned to a second cant angle with respect to the axis of extension.

At box 760, whether the continued operation of the aerial vehicle with the propeller in the current geometric configuration is desired may be determined. If the continued operation of the aerial vehicle in the current geometric configuration is desired, then the process returns to box 720, where the operation of the aerial vehicle is monitored, e.g., using one or more sensors or sensing systems. If the continued operation of the aerial vehicle in the current geometric configuration is no longer desired, however, then the process ends.

Figure 8:
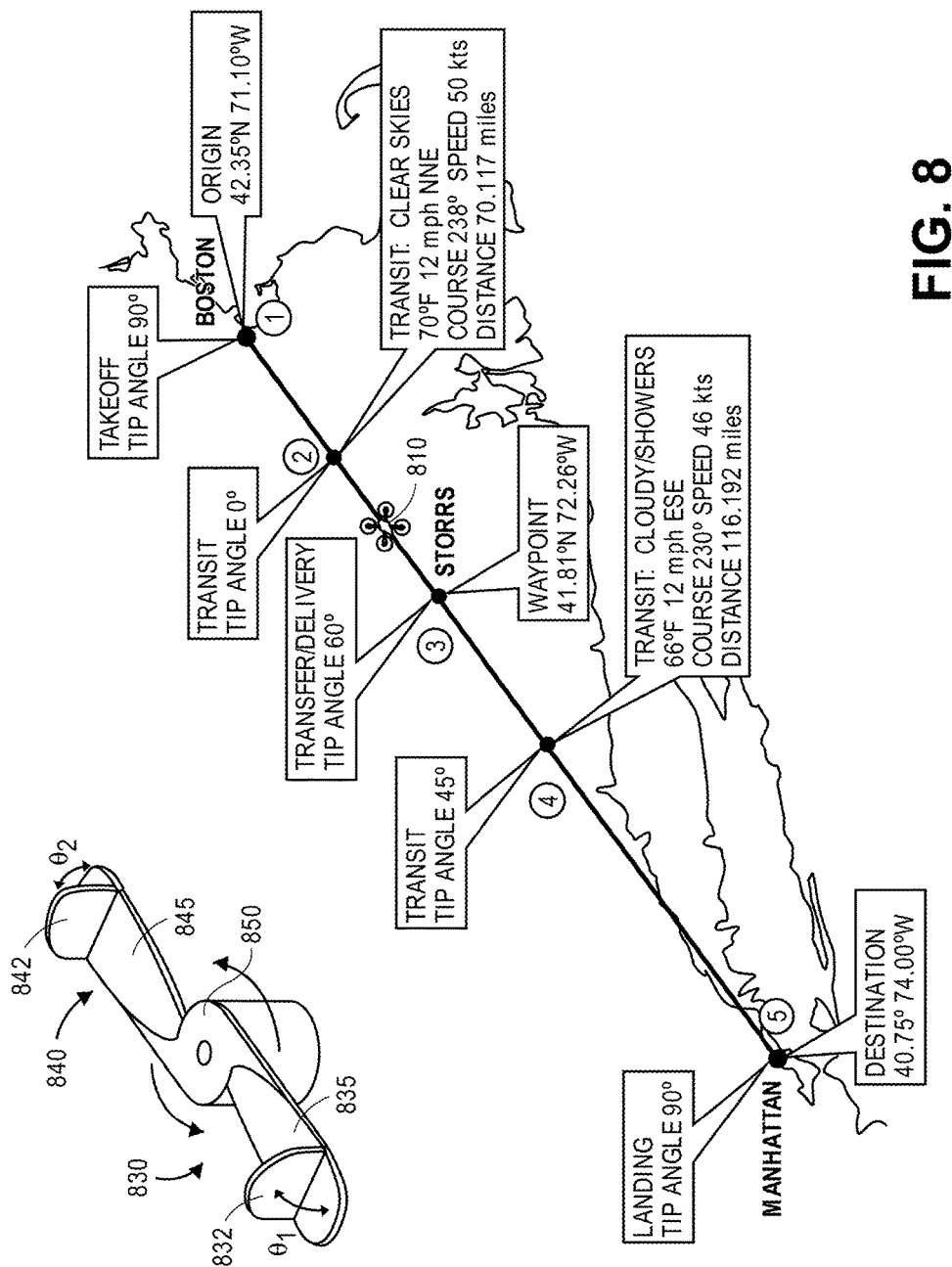
FIG. 8 is a view of aspects of one aerial vehicle having a propeller with a geometrically reconfigurable blade in accordance with embodiments of the present disclosure.

Referring to FIG. 8, a view of aspects of one aerial vehicle 810 having a propeller with a geometrically reconfigurable blade in accordance with embodiments of the present disclosure is shown. Except where otherwise noted, reference numerals preceded by the number "8" shown in FIG. 8 indicate components or features that are similar to components or features having reference numerals preceded by the number "6" shown in FIG. 6, by the number "4" shown in FIG. 4A, 4B or 4C, or by the number "1" shown in FIGS. 1A through 1C.

As is shown in FIG. 8, the multi-rotor aerial vehicle 810 is en route from an origin in Boston, Mass., to a destination in New York, N.Y., by way of Storrs, Conn. The aerial vehicle 810 includes at least one reconfigurable propeller 820 having a pair of blades 830, 840 mounted about a hub 850. The blade 830 includes a reconfigurable blade tip 832 joined to a blade root 835. The blade tip 832 may be realigned to any cant angle $\theta_1$ with respect to the blade root 835, e.g., by one or more mechanical or electrical means. Likewise, the blade 840 includes a reconfigurable blade tip 842 joined to a blade root 845. The blade tip 842 may be realigned to any cant angle $\theta_2$ with respect to the blade root 845. The cant angles $\theta_1$, $\theta_2$ at which the blade tips 832, 842 are provided with respect to the blade roots 835, 845 may be selected on any basis, in order to balance operational commitments of the aerial vehicle 810 against the adverse effects of tip vortices on the propeller 820, or for any other purpose.

As is discussed above, in accordance with the present disclosure, a propeller may be geometrically reconfigured in any manner and in response to any environmental conditions or operational characteristics. For example, the propellers of the present disclosure may be reconfigured based on a mode of transit of the aerial vehicle (e.g., vertical evolutions such as take-offs, landings or altitude changes, or horizontal evolutions such as transits between the origin and the destination, or any intervening waypoints. The propellers may be reconfigured on any basis during the operation of the aerial vehicle, including but not limited to dynamic operational characteristics such as altitudes, courses, speeds, rates of climb or descent, turn rates, accelerations, tracked positions, fuel level, battery level or radiated noise; or environmental conditions such as temperatures, pressures, humidities, wind speeds, wind directions, times of day or days of a week, month or year when an aerial vehicle is operating, measures of cloud coverage or sunshine, or surface conditions or textures.

As is shown in FIG. 8, the aerial vehicle 810 begins its transit by departing from the origin with cant angles of the blade tips 832, 842 provided at ninety degrees (90°), viz., one or both of the cant angle $\theta_1$ or the cant angle $\theta_2$, with respect to the blade roots 835, 845, in order to optimize the efficiency of the propeller 820 during the vertical flight operations.

Once the aerial vehicle 810 reaches a cruising altitude, the blade tips 832, 842 may transition to an optimal configuration for a transit from the origin to an intervening waypoint, based on any operational characteristics or environmental conditions such as weather, wind, duration, distance, available power, radiated noise, surface conditions, legal or regulatory restrictions, or any other relevant factors, that may be predicted or sensed while the aerial vehicle 810 is en route. For example, as is shown in FIG. 8, when the aerial vehicle 810 is traveling from the origin to the waypoint in favorable conditions such as clear skies, warm temperatures and mild winds, the aerial vehicle 810 may operate the propeller 820 with the blade tips 832, 842 at static zero degree (0°) cant angles with respect to the blade roots 835, 845 in order to minimize drag during the transit. Alternatively, as is discussed above, the blade tips 832, 842 may be reconfigured in a dynamic manner during the transit, e.g., with the blade tips 832, 842 co-aligned with the blade roots 835, 845 when the propeller 820 is aligned with a direction of travel of the aerial vehicle 810, and with the blade tips 832, 842 at a positive cant angle with respect to the blade roots 835, 845 when the propeller 820 is aligned perpendicular to the direction of travel. Those of ordinary skill in the pertinent arts will recognize that the blade tips or other features of a reconfigurable propeller may be geometrically reconfigured in any static or dynamic manner in accordance with the present disclosure.

When the aerial vehicle 810 reaches the waypoint, the cant angles of the blade tips 832, 842 may be further modified with respect to the blade roots 835, 845 in a manner consistent with any requirements of the aerial vehicle 810, e.g., missions or functions being performed by the aerial vehicle 810. For example, as is shown in FIG. 8, when the aerial vehicle 810 is performing a specific mission, such as the retrieval or delivery of one or more payloads, the aerial vehicle 810 may operate the propeller with the blade tips 832, 842 at an cant angle with respect to the blade roots 835, 845, viz., a sixty degree (60°) cant angle, may be selected based on any relevant factor, including surface conditions, population density, air traffic, wind speed, weather conditions or other factors relating to the mission or the waypoint.

Subsequently, when the aerial vehicle 810 departs from the waypoint, the blade tips may transition to an optimal configuration for a transit from the waypoint to the destination, based on any operational characteristics or environmental conditions that may be predicted or sensed while the aerial vehicle 810 is en route. For example, as is shown in FIG. 8, when the aerial vehicle 810 is traveling in unfavorable or uncertain conditions such as cloudy skies or amid rain showers, or in colder weather or higher winds, the aerial vehicle 810 may operate the blade tips 832, 842 at static forty-five degree (45°) cant angles with respect to the blade roots 835, 845 in order to reduce any adverse effects of tip vortices while maintaining proper control over the aerial vehicle 810 during such conditions. Alternatively, as is discussed above, the blade tips 832, 842 may be reconfigured in a dynamic manner during the transit.

Finally, as the aerial vehicle 810 arrives at the destination, the blade tips 832, 842 may again be reconfigured with respect to the blade roots 835, 845 as the aerial vehicle 810 conducts a landing operation at the destination. As is shown in FIG. 8, the blade tips 832, 842 may be repositioned to ninety-degree (90°) cant angles with respect to the blade roots 835, 845 in order to optimize the efficiency of the propeller 820 during the vertical flight operations.

Those of ordinary skill in the pertinent arts will recognize that the propellers disclosed herein may be reconfigured in accordance with a schedule, which may be established in accordance with a transit plan for an aerial vehicle, such that the propellers are geometrically reconfigured when the aerial vehicle reaches a predetermined position, altitude or speed, or at a predetermined time. The propellers may also be reconfigured when one or information or data regarding one or more operational characteristics or environmental conditions of the aerial vehicle is sensed or predicted, and the aerial vehicle may include one or more sensors for continuously monitoring for such characteristics or conditions, or one or more computer processors for predicting such characteristics or conditions, e.g., according to one or more machine learning systems or algorithms. For example, the propellers may be reconfigured when a specific radiated noise level, battery capacity, weather condition, or motor speed (e.g., angular velocity) is recognized or anticipated. The reconfigurations of the propellers may be static or dynamic in nature, and may be made to any degree or extent between maximum and minimum physical or functional limits. For example, a blade tip may be reconfigured to any cant angle with respect to a blade root between a maximum absolute limit and zero (e.g., when the blade tip is co-aligned with an axis of radial extension defined by the blade root).

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the pertinent arts will recognize that uses of one or more of the reconfigurable propellers disclosed herein are not so limited, and may be utilized in connection with any type or form of aerial vehicle (e.g., manned or unmanned). Reconfigurable propellers of the present disclosure may have any number of blades, and any portion of such blades may be reconfigured in any manner during operations of an aerial vehicle. Likewise, a determination that a reconfigurable propeller should be geometrically reconfigured may be made on any basis. The manner in which a configuration of a propeller may be determined is not limited by any of the embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIGS. 3, 5 and 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle (UAV) propulsion system comprising:
    a first motor mounted to a UAV;
    a first propeller comprising a first blade root, a first blade tip, and a first hub,
        wherein the first blade root has a first proximal end mounted to the first hub and a first distal end pivotably joined to the first blade tip by a first hinge,
        wherein the first motor is rotatably coupled to the first hub, and
        wherein the first motor is configured to rotate the first propeller through a plurality of angular orientations about a first axis; and
    at least one computer processor in communication with at least the first motor and the first propeller, wherein the at least one computer processor is configured to execute a method comprising:
        causing the first motor to rotate the first propeller, wherein causing the first motor to rotate the first propeller comprises:
            aligning the first blade tip at a first cant angle with respect to the first blade root when the first propeller is at a first angular orientation about the first axis; and
            aligning the first blade tip at a second cant angle with respect to the first blade root when the first propeller is at a second angular orientation about the first axis.

2. The UAV propulsion system of claim 1,
    wherein the first propeller further comprises a second blade root and a second blade tip,
    wherein the second blade root has a second proximal end mounted to the first hub and a second distal end pivotably joined to the second blade tip by a second hinge, and
    wherein causing the first motor to rotate the first propeller further comprises:
        aligning the second blade tip at a third cant angle with respect to the second blade root when the second blade root is at a third angular orientation about the first axis; and
        aligning the second blade tip at a fourth cant angle with respect to the second blade root when the second blade is at a fourth angular orientation about the first axis.

3. The UAV propulsion system of claim 1, further comprising:
    a second motor mounted to the UAV; and
    a second propeller comprising a second blade root, a second blade tip, and a second hub,
        wherein the second blade root has a second proximal end mounted to the second hub and a second distal end pivotably joined to the second blade tip by a second hinge,
        wherein the second motor is rotatably coupled to the second hub,
        wherein the second motor is configured to rotate the second propeller through a plurality of angular orientations about a second axis,
        wherein the at least one computer processor is in communication with at least the second motor and the second propeller, and
        wherein the method further comprises:
        causing the second motor to rotate the second propeller, wherein causing the second motor to rotate the second propeller comprises:
            aligning the second blade tip at a third cant angle with respect to the second blade root when the second propeller is at a third angular orientation about the second axis; and
            aligning the second blade tip at a fourth cant angle with respect to the second blade root when the second propeller is at a fourth angular orientation about the second axis.

4. The UAV propulsion system of claim 3, wherein each of the first cant angle and the third cant angle is approximately zero degrees, and
    wherein each of the second cant angle and the fourth cant angle is approximately ninety degrees.

5. The UAV propulsion system of claim 1,
    wherein the first blade root further comprises a first mechanical operator configured to vary a cant angle of the first blade tip within a first range comprising the first cant angle and the second cant angle, and
    wherein the first mechanical operator is configured to operate under control of the at least one computer processor.

6. The UAV propulsion system of claim 1,
    wherein aligning the first blade tip at the first cant angle comprises:
        determining that the first propeller is at the first angular orientation about the first axis;
        providing a first control signal to the first propeller;
        in response to the first control signal, causing the first blade tip to be aligned at the first cant angle with respect to the first blade root; and wherein aligning the first blade tip at the second cant angle comprises:
  determining that the first propeller is at the second angular orientation about the first axis;
  providing a second control signal to the second propeller; and
  in response to the second control signal,
    causing the first blade tip to be aligned at the second cant angle with respect to the first blade root.

7. The UAV propulsion system of claim 1, wherein the method further comprises:
  predicting, prior to a first time, an attribute of the aerial vehicle at the first time according to at least one machine learning algorithm; and
  selecting each of the first cant angle and the second cant angle based at least in part on the predicted attribute of the aerial vehicle at the first time,
  wherein the predicted attribute of the unmanned aerial vehicle at the first time is at least one of:
    a position, a speed, an acceleration, a rate of climb, a rate of descent, a turn rate, a temperature, a radiated sound, a barometric pressure, a weather event, a wind speed or a wind direction.

8. A method comprising:
  initiating an operation of a first propeller, wherein the first propeller comprises a first blade root having a first proximal end coupled to a first hub and a first distal end pivotably coupled to a first blade tip by a first variable-cant connection, and wherein the first blade tip is at a first cant angle with respect to the first blade root at a first time;
  determining a first attribute of the first propeller at a second time, wherein the first attribute of the first propeller is a first angular orientation of the first blade root about a first axis;
  in response to determining the first attribute of the first propeller at the second time,
    identifying a second cant angle with respect to the first blade root based at least in part on the first attribute of the first propeller, and
    causing the first blade tip to pivot about the first variable-cant connection from the first cant angle with respect to the first blade root to the second cant angle with respect to the first blade root;
  determining a second attribute of the first propeller at a third time, wherein the second attribute of the first propeller is a second angular orientation of the first blade root about the first axis; and
  in response to determining the second attribute of the first propeller at the third time,
    causing the first blade tip to pivot about the first variable-cant connection from the second cant angle with respect to the first blade root to the first cant angle with respect to the first blade root.

9. The method of claim 8, wherein the first propeller is rotatably coupled to a first rotatable mast of a first motor,
  wherein the first rotatable mast defines a first axis, and
  wherein initiating the operation of the first propeller comprises:
    causing, by the first motor, the first propeller to rotate about the first axis at a first predetermined speed.

10. The method of claim 8, wherein the first propeller is rotatably mounted to an aerial vehicle,
  wherein the aerial vehicle further comprises at least one sensor, and
  wherein determining the first attribute of the first propeller at the second time comprises:
    capturing, by the at least one sensor, information regarding the first attribute at the second time.

11. The method of claim 8, wherein the first propeller is rotatably mounted to an aerial vehicle, and
  wherein determining the first attribute of the first propeller at the second time comprises:
    defining a model for predicting at least one attribute of the aerial vehicle according to at least one machine learning algorithm by at least one computer processor;
    providing historical data regarding operations of aerial vehicles to the model as inputs by the at least one computer processor;
    receiving at least one output from the model; and
    predicting, prior to the second time, the first attribute of the first propeller at the second time according to the model by the at least one computer processor based at least in part on the at least one output.

12. The method of claim 8,
  wherein the first blade root comprises a first mechanical operator within the first propeller and wherein the first mechanical operator is configured to vary a cant angle of the first blade tip within a predetermined range comprising the first cant angle and the second cant angle.

13. A method comprising:
  initiating an operation of a first propeller rotatably coupled to an aerial vehicle, wherein the first propeller comprises a first blade root having a first proximal end coupled to a first hub and a first distal end pivotably coupled to a first blade tip by a first variable-cant connection, wherein the first blade tip is at a first cant angle with respect to the first blade root at a first time, and wherein the aerial vehicle comprises at least one sensor;
  capturing, by the at least one sensor, first acoustic energy radiated by the aerial vehicle at a second time;
  determining at least one of a first sound pressure level or a first frequency of the first acoustic energy, and
  in response to capturing the first acoustic energy radiated by the aerial vehicle at the second time,
    selecting a second cant angle with respect to the first blade root based at least in part on at least one of the first sound pressure level or the first frequency; and
    causing the first blade tip to pivot about the first variable-cant connection from the first cant angle with respect to the first blade root to the second cant angle with respect to the first blade root.

14. A method comprising:
  initiating an operation of a first propeller rotatably coupled to an aerial vehicle, wherein the first propeller comprises a first blade root having a first proximal end coupled to a first hub and a first distal end pivotably coupled to a first blade tip by a first variable-cant connection, and wherein the first blade tip is at a first cant angle with respect to the first blade root at a first time, and wherein the aerial vehicle comprises at least one sensor;
  determining, by the at least one sensor, a first position of the aerial vehicle at a second time;
  in response to determining the first position of the aerial vehicle at the second time,
    selecting a second cant angle with respect to the first blade root based at least in part on the first position; and causing the first blade tip to pivot about the first variable-cant connection from the first cant angle with respect to the first blade root to the second cant angle with respect to the first blade root.

15. The method of claim 14, wherein selecting the second cant angle with respect to the first blade root further comprises:
identifying a noise threshold associated with the first position, wherein the noise threshold is at least one of a sound pressure level threshold or a frequency threshold; and
selecting the second cant angle based at least in part on the noise threshold.

16. A method comprising:
initiating an operation of a first propeller rotatably coupled to an aerial vehicle, wherein the first propeller comprises a first blade root having a first proximal end coupled to a first hub and a first distal end pivotably coupled to a first blade tip by a first variable-cant connection, wherein the first blade tip is at a first cant angle with respect to the first blade root at a first time, and wherein the aerial vehicle comprises at least one sensor;
capturing, by the at least one sensor, information regarding a first environmental condition in a vicinity of the first propeller at a second time, wherein the information is at least one of a level of precipitation, a level of cloud coverage, a level of sunshine, an atmospheric temperature, a barometric pressure, a weather event or a surface condition, and
in response to capturing the information regarding the first environmental condition in the vicinity of the first propeller at the second time,
selecting a second cant angle with respect to the first blade root based at least in part on the information regarding the first environmental condition; and
causing the first blade tip to pivot about the first variable-cant connection from the first cant angle with respect to the first blade root to the second cant angle with respect to the first blade root.

17. A method for operating an aerial vehicle,
wherein the aerial vehicle comprises a controller, an acoustic sensor, a motor, and a propeller rotatably coupled to the motor,
wherein the propeller comprises a hub, a first blade and the second blade, and
wherein the method comprises:
aligning, by a first mechanical operator, a first blade tip of the first blade of the propeller at a first cant angle with respect to a first blade root, wherein the first blade root defines a first air foil having the first mechanical operator within the first air foil, wherein the first blade tip is pivotably joined to a first distal end of the first blade root by a first hinge provided at a radial distance from the hub, wherein a first proximal end of the first blade root is mounted about the hub, and wherein the first blade tip is aligned by the first mechanical operator;
aligning, by a second mechanical operator, a second blade tip of the second blade of the propeller at the first cant angle with respect to a second blade root;
causing a first operation of the motor at a first operating speed;
capturing first acoustic energy radiated by the aerial vehicle at a first time; and in response to capturing the first acoustic energy,
selecting a second cant angle based at least in part on the first acoustic energy; and
aligning, by the first mechanical operator, the first blade tip at the second cant angle with respect to the first blade root.

18. The method of claim 17, further comprising:
in response to capturing the first acoustic energy,
aligning, by the second mechanical operator, the second blade tip at the second cant angle with respect to the first blade root.

19. The method of claim 17, further comprising:
aligning, by the second mechanical operator, the second blade tip to a third cant angle with respect to the first blade root,
wherein the third cant angle is not the first cant angle or the second cant angle.

20. The method of claim 17, further comprising:
capturing second acoustic energy radiated by the aerial vehicle at a second time, wherein the second time follows the first time;
selecting a third cant angle based at least in part on the second acoustic energy;
aligning, by the first mechanical operator, the first blade tip at the third cant angle with respect to the first blade root.

21. A method for operating an aerial vehicle,
wherein the aerial vehicle comprises a controller, an acoustic sensor, a motor, and a propeller rotatably coupled to the motor, and
wherein the method comprises:
aligning, by a first mechanical operator, a first blade tip of a first blade of the propeller at a first cant angle with respect to a first blade root;
aligning, by a second mechanical operator, a second blade tip of a second blade of the propeller at the first cant angle with respect to a second blade root;
causing a first operation of the motor at a first operating speed;
capturing first acoustic energy radiated by the aerial vehicle at a first time; and
in response to capturing the first acoustic energy,
selecting a second operating speed for the motor based at least in part on the first acoustic energy;
selecting a second cant angle based at least in part on the first acoustic energy and the second operating speed;
aligning, by the first mechanical operator, the first blade tip at the second cant angle with respect to the first blade root; and
causing a second operation of the motor at the second operating speed.

22. A method for operating an aerial vehicle,
wherein the aerial vehicle comprises a position sensor, a controller, an acoustic sensor, a motor and a propeller rotatably coupled to the motor, and
wherein the method comprises:
aligning, by a first mechanical operator, a first blade tip of a first blade of the propeller at a first cant angle with respect to a first blade root;
aligning, by a second mechanical operator, a second blade tip of a second blade of the propeller at the first cant angle with respect to a second blade root;
causing a first operation of the motor at a first operating speed;
capturing first acoustic energy radiated by the aerial vehicle at a first time;

in response to capturing the first acoustic energy,
determining, by the position sensor, a position of the aerial vehicle at approximately the first time;
determining a noise threshold associated with the position of the aerial vehicle at the first time, wherein the noise threshold is at least one of a sound pressure level threshold or a frequency threshold;
selecting a second cant angle based at least in part on the first acoustic energy and the noise threshold; and
aligning, by the first mechanical operator, the first blade tip at the second cant angle with respect to the first blade root.

* * * * *